United States Patent
Akahori et al.

(10) Patent No.: US 11,578,143 B2
(45) Date of Patent: Feb. 14, 2023

(54) CROSSLINKED RUBBER COMPOSITION AND PRODUCTION METHOD THEREFOR

(71) Applicants: TOYODA GOSEi CO., LTD., Kiyosu (JP); TOKYO INSTITUTE OF TECHNOLOGY, Tokyo (JP)

(72) Inventors: Naoyuki Akahori, Kiyosu (JP); Akishige Seo, Kiyosu (JP); Naoki Iwase, Kiyosu (JP); Toshikazu Takata, Tokyo (JP); Toyokazu Tsutsuba, Tokyo (JP)

(73) Assignees: TOYODA GOSEI CO., LTD., Aichi-pref. (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/458,650

(22) Filed: Aug. 27, 2021

(65) Prior Publication Data
US 2022/0081493 A1 Mar. 17, 2022

(30) Foreign Application Priority Data
Sep. 14, 2020 (JP) ............... JP2020-153650

(51) Int. Cl.
*C08C 19/22* (2006.01)
*C08F 210/18* (2006.01)

(52) U.S. Cl.
CPC ............ *C08C 19/22* (2013.01); *C08F 210/18* (2013.01)

(58) Field of Classification Search
CPC ..... C08C 19/22; C08F 210/18; C07D 323/00; C07C 291/06
See application file for complete search history.

(56) References Cited

U.S. PATENT DOCUMENTS

| 5,656,693 A | * | 8/1997 | Ellul | ................. C08K 5/34924 525/193 |
| 2013/0123418 A1 | * | 5/2013 | Araujo Da silva | ....... C08L 9/06 264/175 |

FOREIGN PATENT DOCUMENTS

| JP | 2017-160164 | * | 9/2017 |
| JP | 2017-160164 A | | 9/2017 |

OTHER PUBLICATIONS

Translation of JP 2017-160164 (Year: 2017).*

\* cited by examiner

*Primary Examiner* — Robert C Boyle
(74) *Attorney, Agent, or Firm* — Posz Law Group, PLC

(57) ABSTRACT

A crosslinked rubber composition contains ethylene-propylene-diene copolymer rubber crosslinked with a rotaxane compound having a cyclic molecule and an axial molecule penetrating through the cyclic molecule. In the crosslinked rubber composition, the ethylene-propylene-diene copolymer rubber contains vinylnorbornene, dicyclopentadiene, or tetrahydroindene as a diene component, and the rotaxane compound has a nitrile oxide group on the cyclic molecule and one end of the axial molecule, and the cyclic molecule is crown ether.

7 Claims, 3 Drawing Sheets

EXAMPLE 1: RCP-VNB-EPDM

COMPARATIVE EXAMPLE 1: CCP-VNB-EPDM

CROSSLINKED RUBBER COMPOSITION AND PRODUCTION METHOD THEREFOR

TECHNICAL FIELD

The present invention relates to a crosslinked rubber composition.

BACKGROUND ART

Vulcanized rubber has superior characteristics and thus is widely used as an industrial material. When unvulcanized rubber is vulcanized by any technique, the vulcanized rubber exhibits strength and elasticity, but exhibits a limited elongation at break. Tough rubber that is less likely to break could be used in the large deformation regime to which conventional rubber cannot be applied. However, existing vulcanized rubber compositions cannot be applied to the large deformation regime.

Patent Document 1 discloses "a rotaxane compound having one or more cyclic molecules, and one chain molecule (corresponding to "axial molecule" in the present application) penetrating through the one or more cyclic molecules, wherein one or more molecules among the one or more cyclic molecules and the one chain molecule have one or more reactive groups selected from the group consisting of a nitrile oxide group and an azide group," which compound is used for the synthesis of, for example, a rotaxane network polymer (RCP), which is a crosslinked polymer having a rotaxane structure at crosslinking points.

Patent Document 1 also discloses that raw material rubber (e.g., polybutadiene rubber, natural rubber, or styrene-butadiene rubber) was reacted with nitrile-N-oxide 4-3 rotaxane in a chloroform solution for 24 hours, to thereby produce a solvent-insoluble crosslinked product in Example 9-1.

Patent Document 1 also describes, in another section, ethylene-propylene-diene copolymer rubber as one exemplary rubber. However, Patent Document 1 does not describe in any example that the ethylene-propylene-diene copolymer rubber was reacted with a rotaxane compound to produce a crosslinked product, and does not describe the ethylene-propylene-diene copolymer rubber in detail. The object of the invention in Patent Document 1 is to provide "a technique capable of synthesizing, for example, rotaxane network polymers having various structures," and Patent Document 1 does not include studies on, for example, the elongation, strength, and yield of a crosslinked product. The elongation and strength of a crosslinked product is often required particularly in rubber parts for automobiles (e.g., weather strip, hose, and drive shaft boot).

CITATION LIST

Patent Documents

[Patent Document 1] Japanese Unexamined Patent Application Publication No. 2017-160164 (JP 2017-160164 A)

SUMMARY OF THE INVENTION

Technical Problem

A rotaxane compound is a molecular assembly having a structure wherein an axial molecule slidably penetrates through a cyclic molecule, and the cyclic molecule is prevented from being removed by blocking groups disposed at both ends of the axial molecule, and the compound is also called "slide-ring material."

The present inventors have paid attention to rubber wherein a crosslinking portion is slidably crosslinked (hereinafter may be referred to as "slide-crosslinked") with such a rotaxane compound, since an improvement in elongation is expected through slide-crosslinking. Thus, the present inventors have made an attempt to crosslink ethylene-propylene-diene copolymer rubber containing ethylidene norbornene as a diene component (which is most commonly used as ethylene-propylene-diene copolymer rubber) with a rotaxane compound having a nitrile oxide group on a cyclic molecule and one end of an axial molecule. However, the present inventors have found that the crosslinked product is not suitable for mass production, since the yield of the product is low, and the rotaxane compound, which cannot be recovered after the reaction, must be previously incorporated in an excessively large amount.

In view of the foregoing, an object of the present invention is to provide a crosslinked rubber composition which is produced at high yield, and which achieves a dramatically large elongation at break and an excellent tensile strength at break.

Solution to Problem

Ethylene-propylene-diene copolymer rubber is composed of an ethylene component, a propylene component, and a diene component. A nitrile oxide group can be click-reacted with the diene component. However, according to studies by the present inventors, the production yield is low as described above due to low efficiency of reaction of the nitrile oxide group with an ethylidene norbornene group. Thus, the present inventors have further conducted extensive studies, and as a result have found that the use of ethylene-propylene-diene copolymer rubber containing vinylnorbornene, dicyclopentadiene, or tetrahydroindene as a diene component achieves high reaction efficiency between a nitrile oxide group and a vinylnorbornene group, a dicyclopentadiene group, or a tetrahydroindene group.

[1] Crosslinked Rubber Composition

A crosslinked rubber composition contains ethylene-propylene-diene copolymer rubber crosslinked with a rotaxane compound having a cyclic molecule and an axial molecule penetrating through the cyclic molecule.

In the crosslinked rubber composition, the ethylene-propylene-diene copolymer rubber contains vinylnorbornene, dicyclopentadiene, or tetrahydroindene as a diene component, and the rotaxane compound has a nitrile oxide group on the cyclic molecule and one end of the axial molecule, and the cyclic molecule is crown ether.

The diene component of the ethylene-propylene-diene copolymer rubber is preferably vinylnorbornene, since the yield of the crosslinked rubber composition is particularly high.

The rotaxane compound is preferably incorporated in an amount of 0.1 to 5 equivalents, with the proviso that 0.5 mol of the rotaxane compound relative to 1 mol of the diene component is 1 equivalent of the rotaxane compound.

The tensile characteristics of the crosslinked rubber composition can be controlled by, for example, adjustment of the equivalent of the rotaxane compound incorporated. For example, the crosslinked rubber composition can achieve the following characteristics.

(A) An elongation at break of at least 1,000%.

(B) An elongation at break of at least 2,000%, and a tensile strength at break of at least 1 MPa.

(C) An elongation at break of at least 1,500%, and a tensile strength at break of at least 2 MPa.

(D) A stress of at least 1 MPa at 1,000% elongation.

(E) An elongation at break of at least 1,000%, and a tensile strength at break of at least 4 MPa.

(F) A stress of at least 1 MPa at 500% elongation.

[2] Production Method for Crosslinked Rubber Composition

A method for producing a crosslinked rubber composition includes crosslinking ethylene-propylene-diene copolymer rubber containing vinylnorbornene, dicyclopentadiene, or tetrahydroindene as a diene component with a rotaxane compound serving as a crosslinking agent at a reaction temperature of 40° C. or higher. In the method, the rotaxane compound has a cyclic molecule and an axial molecule penetrating through the cyclic molecule and has a nitrile oxide group on the cyclic molecule and one end of the axial molecule.

Effects

A nitrile oxide group (hereinafter referred to as "CNO group") is a type of 1,3-dipole, and causes click reaction (i.e., [3+2] addition-cyclization reaction) with the double bond (unsaturated bond) of a diene component. Thus, the CNO group on the cyclic molecule of the rotaxane compound is click-reacted with a diene component of a molecule of ethylene-propylene-diene copolymer rubber (hereinafter referred to as "EPDM"), to thereby form a crosslinked portion that is slidable with respect to the axial molecule. Meanwhile, the CNO group on one end of the axial molecule is click-reacted with a diene component of another EPDM molecule, to thereby form a fixedly crosslinked point. Thus, the two EPDM molecules are slide-crosslinked (see FIG. 1A shown below).

In the case of conventional fixed crosslinking, when entangled main chains are completely elongated, there is no room for elongation. In contrast, in the case of slide crosslinking, crosslinked portions are slidable even after complete elongation of entangled main chains, and thus further elongation is achieved, resulting in a dramatic increase in elongation at break and an increase in tensile strength at break. Therefore, the crosslinked rubber composition of the present invention can be suitably used for the production of, for example, automobile parts (e.g., weather strip, hose, and drive shaft boot), which are required to exhibit large elongation and high tensile strength.

The use of EPDM containing, as a diene component, vinylnorbornene (hereinafter referred to as "VNB"), dicyclopentadiene (hereinafter referred to as "DCPD"), or tetrahydroindene (hereinafter referred to as "THI") causes click reaction between a CNO group and a VNB group, a DCPD group, or a THI group at high reaction efficiency, resulting in high yield of the resultant crosslinked rubber composition. Thus, the crosslinked rubber composition of the present invention can be used for mass products (e.g., automobile parts), since the rotaxane compound, which cannot be recovered after the reaction, is not required to be previously incorporated in an excessively large amount.

Advantageous Effects of Invention

The present invention can provide a crosslinked rubber composition which is produced at high yield, and which achieves a dramatically large elongation at break and a high tensile strength at break.

DESCRIPTION OF EMBODIMENTS

Figure 1A:
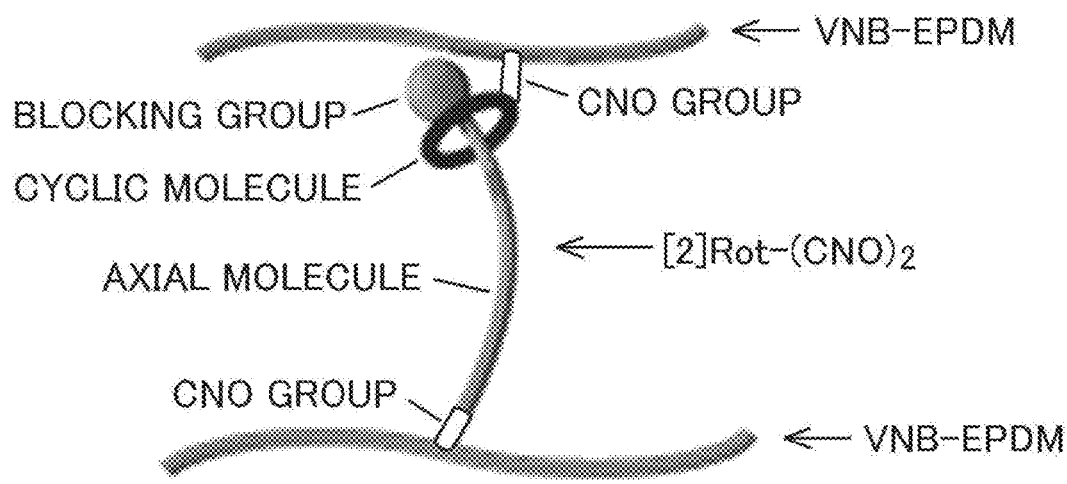
FIG. 1A is a schematic view of RCP-VNB-EPDM of Example 1.

Modes of the present invention will next be described.

1. EPDM

As described above, EPDM containing VNB, DCPD, or THI as a diene component is used.

No particular limitation is imposed on the diene content of EPDM.

2. Rotaxane Compound

As described above, crown ether is used as a cyclic molecule.

One or more cyclic molecules may be retained on one axial molecule. Preferably, one cyclic molecule is retained on one axial molecule, since the rotaxane compound exhibits good mobility, and the synthesis reaction of the rotaxane compound is readily controlled.

No particular limitation is imposed on the axial molecule, so long as a CNO group can be introduced at one end of the axial molecule. Examples of the axial molecule include polyethers such as polyethylene glycol, polypropylene glycol, and polytetrahydrofuran, polyesters such as polylactic acid, polyamides such as 6-nylon, diene polymers such as polyisoprene and polybutadiene, polyethylene, polypropylene, vinyl polymers such as polyvinyl alcohol, polyvinyl methyl ether, and polyisobutylene, and polydimethylsiloxane.

No particular limitation is imposed on the blocking group at the other end of the axial molecule. Examples of the blocking group include dinitrophenyl group, cyclodextrin group, adamantane group, trityl group, fluorescein group, pyrene group, substituted benzene group (the substituent may be, for example, alkyl, alkyloxy, hydroxy, halogen, cyano, sulfonyl, carboxyl, amino, or phenyl; one or more substituents may be present), optionally substituted polynuclear aromatic group (the substituent may be, for example, the same as those described above; one or more substituents may be present), and steroid group.

3. Temperature of Reaction Between EPDM and Rotaxane Compound

When the reaction temperature is 40° C. or higher, the yield becomes a certain level or more. The reaction temperature is preferably 60° C. or higher from the viewpoint of promoting the reaction. The upper limit of the reaction temperature is not particularly limited, but is probably 250° C.

EXAMPLES

Embodiments of the present invention; i.e., examples of the crosslinked rubber composition and production method therefor of the invention will be described in the following order. The present invention should not be construed as being limited to the examples.

<1> Search for EPDM Having High Reactivity with CNO Group
<2> Synthesis of CNO-Group-Containing Rotaxane Compound as Crosslinking Agent
 <2-1> Synthesis of DB24C8NA
 <2-2> Synthesis of [2]Rot-(NA)$_2$
 <2-3> Synthesis of [2]Rot-(CNO)$_2$
<3> Preparation of Crosslinked Rubber Composition and Tensile Test
 <3-1> Example 1 (RCP) and Comparative Example 1 (CCP)
 <3-2> Examples 2 to 4 (RCP) and Comparative Example 2 (Unvulcanized) and Comparative Example 3 (Vulcanized with Peroxide)

<1> Search for EPDM Having High Reactivity with CNO Group

Before Examples, tests (Test Examples 1 to 9 shown in Table 1) were performed to search for EPDM having high reactivity with a CNO group.

Different types of EPDM were used as follows: ENB-EPDM (diene content: 5.0% by mass) in Test Example 1; THI-EPDM containing THI as a diene component (diene content: 4.0% by mass) in Test Example 2; DCPD-EPDM containing DCPD as a diene component (diene content: 2.5% by mass) in Test Example 3; VNB-EPDM containing VNB as a diene component (diene content: 2.5% by mass) in Test Examples 4 to 8; and VNB-EPDM (diene content: 1.4% by mass) in Test Example 9.

1,1,12,12-Tetraphenyl-1,12-N-oxycyano-2,5,8,11-tetraoxadodecane (hereinafter referred to as "bifunctional CNO") of the following Formula 1 was used as a CNO-group-containing crosslinking agent instead of a rotaxane for the following reason. The purpose of the test is to examine the reactivity between EPDM and a CNO group, and the reactivity is irrelevant to the slidability of a crosslinked portion.

TABLE 1

|   |   | Test Example 1 | Test Example 2 | Test Example 3 | Test Example 4 | Test Example 5 |
|---|---|---|---|---|---|---|
| Rubber | Rubber Type | EPDM | ← | ← | ← | ← |
|   | Diene Type | ENB | THI | DCPD | VNB | ← |
|   | Diene Content [wt %] | 5 | 4 | 5 | 2.5 | ← |
| Crosslinking Agent | Bifunctional CNO |   | ← | ← | ← | ← |
|   | Equivalent: CNO/Diene | 1 | 1 | 1 | 1 | 0.5 |
| Solvent |   | Toluene | Toluene | ← | ← | ← |
| Reaction Temperature [° C.] |   | 100 | 100 | ← | ← | ← |
| Yield [%] |   | 24 | 39 | 50 | 95 | 98 |

|   |   | Test Example 6 | Test Example 7 | Test Example 8 | Test Example 9 |
|---|---|---|---|---|---|
| Rubber |   | ← | ← | ← | ← |
|   |   | ← | ← | ← | ← |
|   |   | ← | ← | ← | 1.4 |
| Crosslinking Agent |   | ← | ← | ← | ← |
|   |   | 0.2 | 1 | 1 | 1 |
| Solvent |   | ← | ← | ← | ← |
| Reaction Temperature [° C.] |   | ← | 60 | 23 | 100 |
| Yield [%] |   | 99 | 93 | 0 | 95 |

[Formula 1]

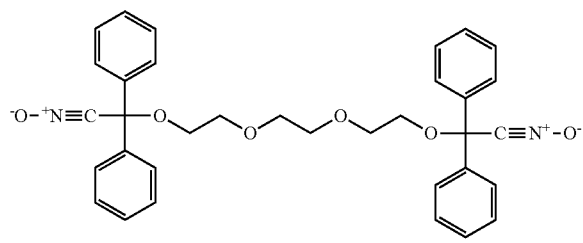

In Test Examples 1 to 4, 0.1 g of each EPDM was dissolved in 1.0 mL of toluene, and a solution of 1 equivalent of the bifunctional CNO in a small amount of toluene (note: one bifunctional CNO molecule reacts with two molecules of a diene component, and thus 0.5 mol of the bifunctional CNO relative to 1 mol of the diene is defined as 1 equivalent of the bifunctional CNO) was incorporated into the EPDM solution. The resultant mixture was heated with stirring in an oil bath at 100° C. (reaction temperature) for five hours. Insoluble matter generated through crosslinking was washed with chloroform, and then dried under reduced pressure, to thereby produce crosslinked EPDM rubber.

In Test Example 5 or 6, crosslinked EPDM rubber was produced in the same manner as in Test Example 4, except that the amount of the bifunctional CNO was changed to 0.5 equivalents or 0.2 equivalents, respectively.

In Test Example 7 or 8, crosslinked EPDM rubber was produced in the same manner as in Test Example 4, except that the reaction temperature was changed to 60° C. or 23° C., respectively.

In Test Example 9, crosslinked EPDM rubber was produced in the same manner as in Test Example 4, except that VNB-EPDM having a diene content of 1.4% by mass was used.

The yield of each of the crosslinked EPDM rubbers of Test Examples 1 to 9 was determined on the basis of the weight of toluene-insoluble EPDM after the reaction (Table 1).

(Test Results)

In Test Example 1, the yield was 24%. The results indicate that three-fourths or more of the EPDM component remained as a non-crosslinked polymer after the reaction, and most of the crosslinking agent component added in an amount of 1 equivalent did not participate in the crosslinking reaction.

In Test Examples 2 to 4, the yield was considerably increased as compared with the case of Test Example 1. In particular, the yield was very high (90% or more) in Test Examples 4 to 7 and 9. The results indicated that EPDM having high reactivity to a CNO group is VNB-EPDM, DCPD-EPDM, or THI-EPDM, and VNB-EPDM has particularly high reactivity. In Test Example 8 wherein the reaction temperature was lowered to 23° C., the yield was zero.

<2> Synthesis of CNO-Group-Containing Rotaxane Compound as Crosslinking Agent

Symbols and abbreviations used in this section have the following meanings.

NACOOH: 7-nitro-6,6-diphenyl-5-oxaheptanoic acid
DB24C8OH: [1,2]benzo-[13,14] (2-hydroxymethyl)benzo-24-crown-8-ether
DB24C8NA: [1,2]benzo-[13,14][2-(7-nitro-6,6-diphenyl-5-oxa-heptanoyloxymethyl)]benzo-24-crown-8-ether
[2]Rot-(NA)$_2$: [2]rotaxane-nitroalkane
[2]Rot-(CNO)$_2$: [2]rotaxane-nitrile oxide <2-1> Synthesis of DB24C8NA Firstly, DB24C8OH (i.e., cyclic molecule (crown ether) having a hydroxy group) was synthesized into DB24C8NA (i.e., nitro-group-introduced crown ether).

[Formula 2]

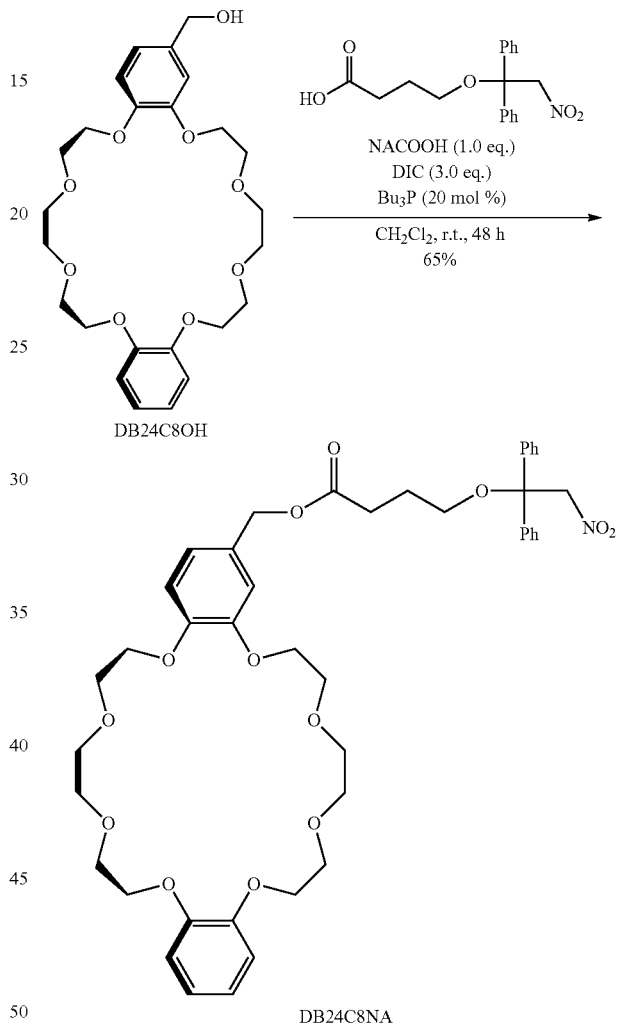

As shown in the scheme of Formula 2, 0.66 g (2.0 mmol) of NACOOH and 0.96 g (2.0 mmol) of DB24C8OH were dissolved in dehydrated dichloromethane, and 0.38 g (3.0 mmol) of N,N'-diisopropylcarbodiimide and 40 μg (0.20 mmol) of tributylphosphine were added to the resultant solution, followed by stirring at room temperature (18 to 28° C. (the same shall apply hereinafter)) for 24 hours. The reaction was traced by 1H NMR, and unreacted NACOOH was found to remain. Thus, 0.38 g (3.0 mmol) of N,N'-diisopropylcarbodiimide and 40 μg (0.20 mmol) of tributylphosphine were further added, and the resultant mixture was stirred at room temperature for 24 hours. The solvent was distilled off under reduced pressure, and the resultant product was purified by silica gel column chromatography (ethyl acetate) and (chloroform→chloroform/methanol=95/5), to thereby produce 1.0 g of DB24C8NA as a white solid.

<2-2> Synthesis of [2]Rot-(NA)₂

Subsequently, Rot-(NA)₂ (i.e., a rotaxane compound having one molecule of the DB24C8NA retained on one axial molecule and a nitro group introduced at one end of the axial molecule) was synthesized.

[Formula 3]

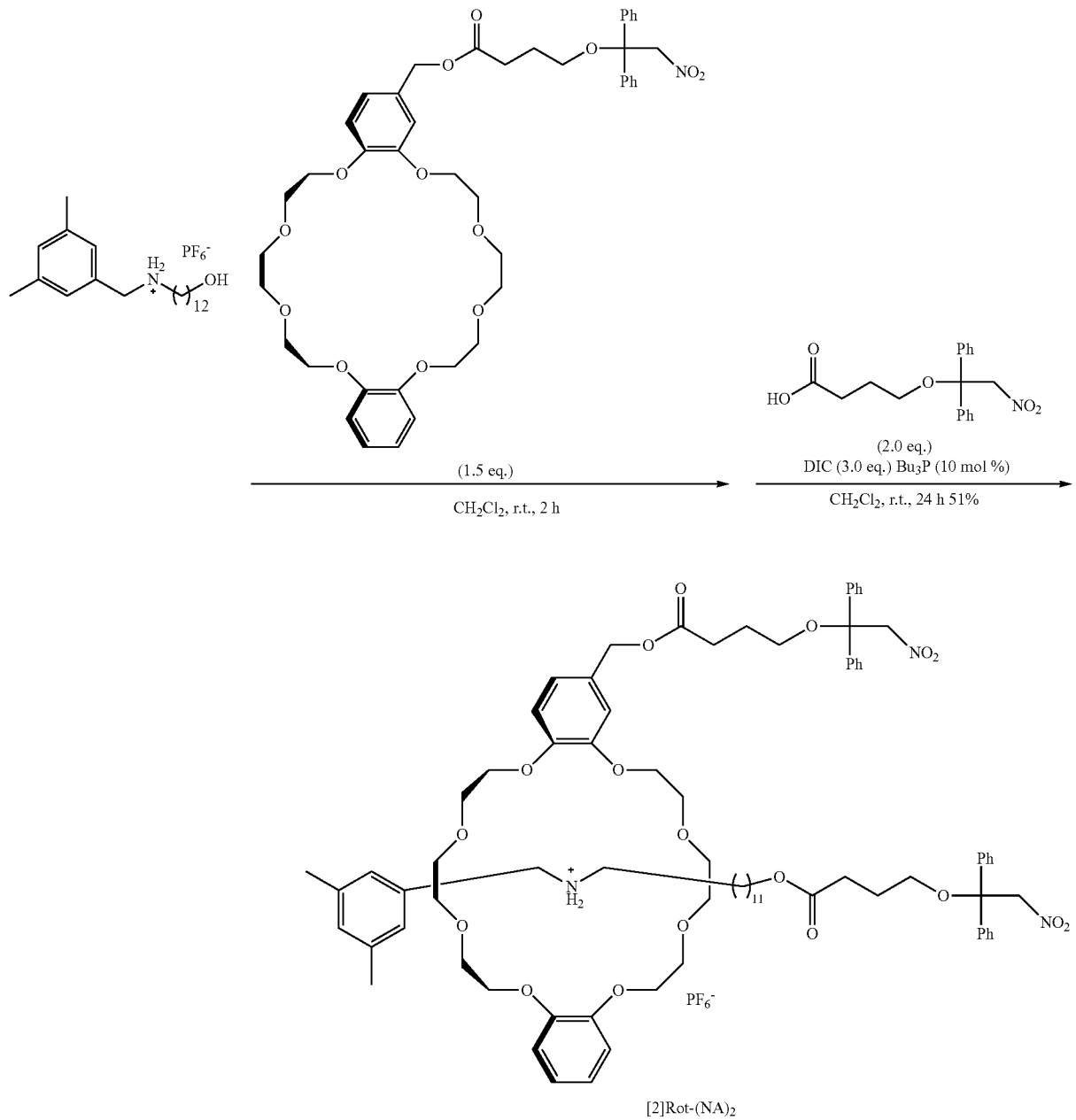

[2]Rot-(NA)₂

As shown in the scheme of Formula 3, 0.86 g (1.8 mmol) of 3,5-dimethylphenylmethyl 12-hydroxydodecylammonium hexafluorophosphate (i.e., an axial molecule having a blocking group at the other end) and 2.2 g (2.8 mmol) of DB24C8NA were dissolved in 3.7 mL of dehydrated dichloromethane, and the resultant solution was stirred at room temperature for two hours, to thereby retain one cyclic molecule on the axial molecule. Thereafter, 1.2 g (3.7 mmol) of NACOOH, 0.70 g (5.5 mmol) of N,N'-diisopropylcarbodiimide, and 37 µg (0.18 mmol) of tributylphosphine were added, and the resultant mixture was stirred at room temperature for 24 hours, to thereby introduce a nitro group at one end of the axial molecule. The resultant product was precipitated in hexane, and then purified by preparative GPC (chloroform), to thereby produce 1.5 g of [2]Rot-(NA)₂ (51%).

<2-3> Synthesis of [2]Rot-(CNO)$_2$

Subsequently, the above-produced [2]Rot-(NA)$_2$ was synthesized into [2]Rot-(CNO)$_2$; i.e., a rotaxane compound having CNO groups on one cyclic molecule and one end of one axial molecule.

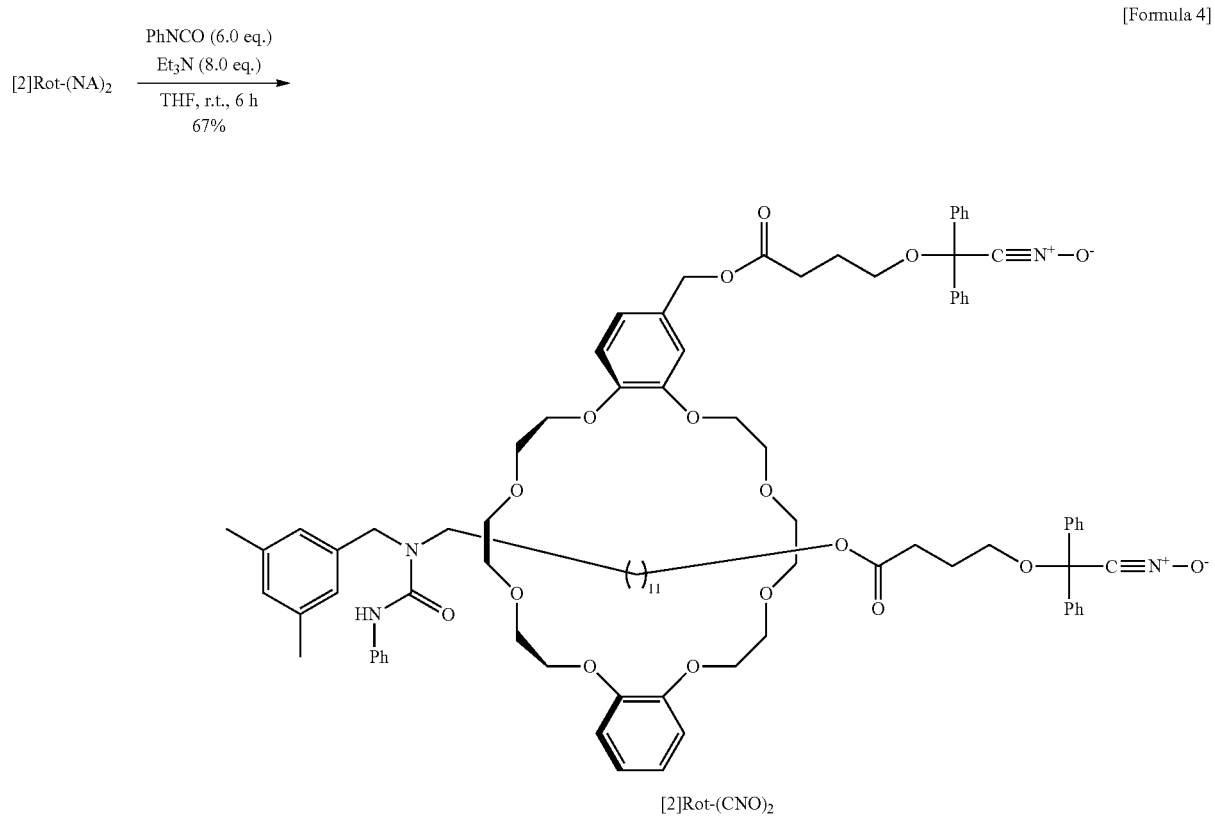

[Formula 4]

As shown in the scheme of Formula 4, 12 mL of dehydrated THF, 0.87 g (7.3 mmol) of phenyl isocyanate, and 1.1 g (11 mmol) of triethylamine were added to 0.96 g (0.61 mmol) of [2]Rot-(NA)$_2$ in an argon atmosphere, and the resultant mixture was stirred at room temperature for six hours, to thereby generate CNO groups on the cyclic molecule and one end of the axial molecule. Insoluble matter was separated through filtration, and the solvent was distilled off. Thereafter, the resultant product was dissolved in chloroform, and insoluble matter was separated through filtration. The resultant residue was precipitated in hexane, and then purified by preparative GPC (chloroform) and silica gel column chromatography (ethyl acetate/hexane=1/2), to thereby produce 0.57 g of [2]Rot-(CNO)$_2$ (67%).

<3> Preparation of Crosslinked Rubber Composition and Tensile Test

Symbols and abbreviations used in this section have the following meanings.

RCP: rotaxane-crosslinked polymer
CCP: covalently crosslinked polymer

<3-1> Example 1 (RCP) and Comparative Example 1 (CCP)

TABLE 2

| | | Comparative Example 1 | Example 1 |
|---|---|---|---|
| Rubber | Rubber Type | EPDM | ← |
| | Diene Type | VNB | ← |
| | Diene Content [wt %] | 2.5 | ← |

TABLE 2-continued

| | Comparative Example 1 | Example 1 |
|---|---|---|
| Crosslinking Agent | Bifunctional CNO | [2]Rot-(CNO)$_2$ |
| Equivalent: CNO/Diene | 1 | 0.5 |
| Solvent | Toluene | ← |
| Reaction Temperature [° C.] | 100 | ← |
| Thickness [mm] | 0.72 | 0.85 |
| Elongation at Break [%] | 694 | 2263 |
| Tensile Strength at Break [MPa] | 0.81 | 2.72 |
| Young's Modulus [MPa] | 0.71 | 0.99 |

The EPDM used was VNB-EPDM (diene content: 1.4% by mass) having a lower diene content than that used in Test Examples 4 to 8 of <1> described above.

In Example 1, the aforementioned [2]Rot-(CNO)$_2$ was used as a CNO-group-containing crosslinking agent. In Comparative Example 1, the same bifunctional CNO as used in the Test Examples of <1> described above was used as a CNO-group-containing crosslinking agent.

In Example 1, 1.0 g of VNB-EPDM was dissolved in 20 mL of toluene, and the resultant solution was poured into a petri dish. Subsequently, the solution was mixed with a solution of 40 mg of [2]Rot-(CNO)$_2$ (corresponding to 0.5 equivalents) in a small amount of toluene (note: one molecule of Rot-(CNO)$_2$ reacts with two molecules of a diene component, and thus 0.5 mol of Rot-(CNO)$_2$ relative to 1 mol of the diene is defined as 1 equivalent of Rot-(CNO) 2), and the resultant mixture was allowed to stand still at room temperature for 12 hours. Thereafter, reaction was allowed to proceed on a hot plate heated to 100° C. in air for 12 hours. The resultant film was immersed in chloroform, and then dried in air at room temperature and under vacuum, to thereby form a film of RCP-VNB-EPDM.

In Comparative Example 1, a film of CCP-EPDM rubber was formed in the same manner as in Example 1, except that the crosslinking agent was changed to 34 mg (corresponding to 1 equivalent) of the bifunctional CNO.

FIG. 1A schematically shows the structure of RCP-VNB-EPDM of Example 1. The CNO group of a Rot-(CNO)$_2$ cyclic molecule click-reacts with a VNB group of an EPDM molecule, to thereby form a crosslinked portion that is slidable with respect to an axial molecule. The CNO group at one end of the axial molecule click-reacts with a VNB group of another EPDM molecule, to thereby form a fixedly crosslinked point. Thus, the two EPDM molecules are slide-crosslinked.

Figure 1B:
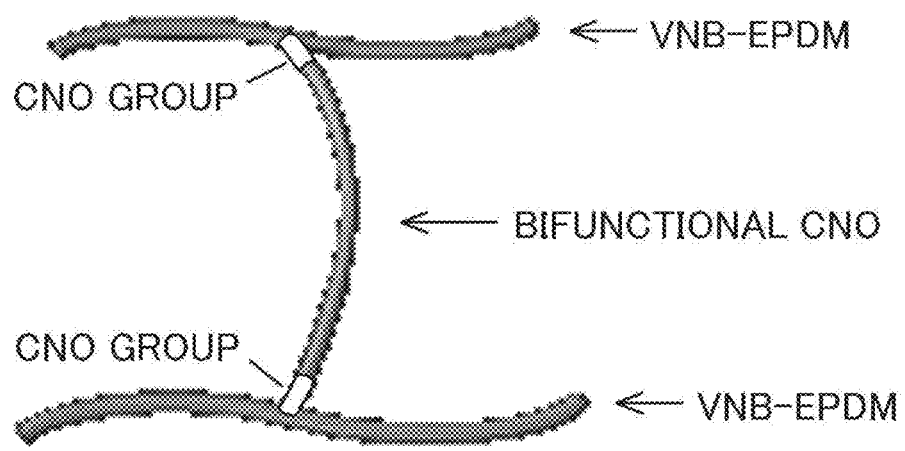
FIG. 1B is a schematic view of CCP-VNB-EPDM of Comparative Example 1.

FIG. 1B schematically shows the structure of CCP-VNB-EPDM of Comparative Example 1. The CNO group at one end of a bifunctional CNO axial molecule click-reacts with a VNB group of an EPDM molecule, and the CNO group at the other end of the axial molecule click-reacts with a VNB group of another EPDM molecule. Thus, the two EPDM molecules are fixedly crosslinked.

Figure 2:
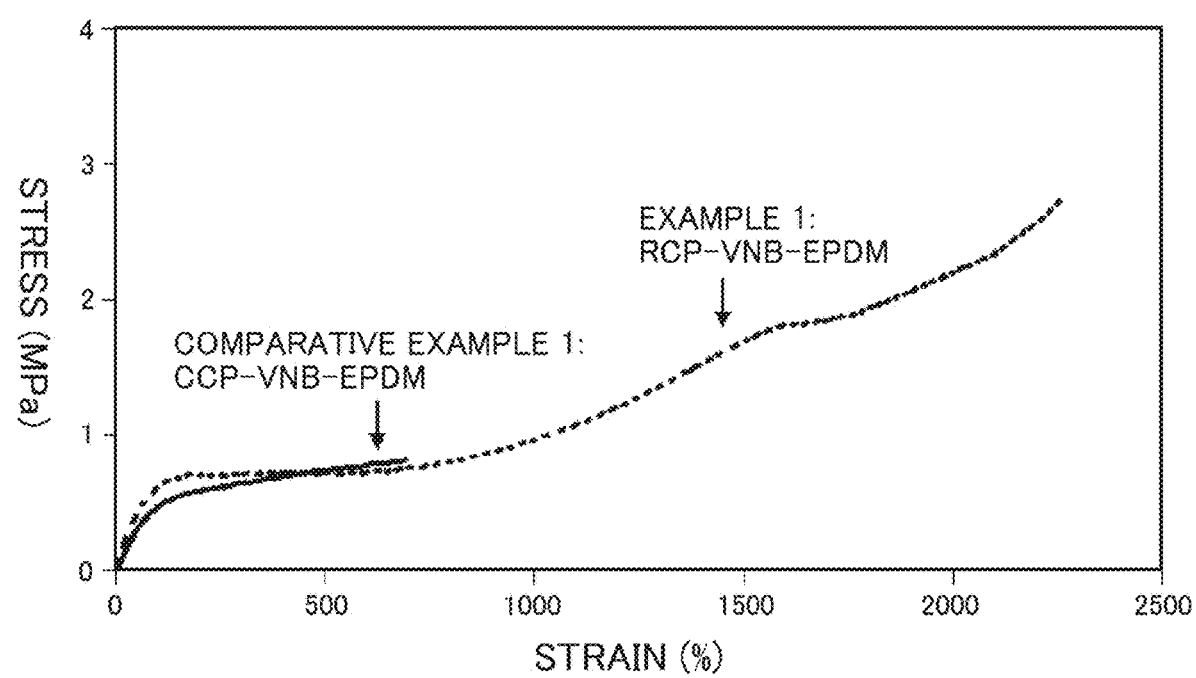
FIG. 2 is a graph showing stress-strain curves recorded in tensile tests in Example 1 and Comparative Example 1.

The thicknesses of the films formed in Example 1 and Comparative Example 1 were measured (Table 2). Each of these films was processed into a sample of dumbbell No. 7 (according to JIS K-6251), and the sample was subjected to a tensile test with a tensile tester (distance between grabbers: 20 mm, tensile speed: 10 mm/minute, room temperature), to thereby record a stress-strain curve (FIG. 2) and to measure elongation at break, tensile strength at break, and Young's modulus (calculated at 30% strain) (Table 2).

(Results of Measurement)

The elongation at break in Comparative Example 1 corresponds to a value falling within a range commonly determined for EPDM.

The elongation at break in Example 1 (i.e., 2,263%) was three times or more that in Comparative Example 1, and was an unprecedented value for EPDM. The tensile strength at break in Example 1 is not particularly high as an absolute value, but is three times or more that in Comparative Example 1 in accordance with an increase in elongation at break. The film of Example 1 satisfies the aforementioned tensile characteristic (B).

Although not shown in Table 2, the yield in Example 1 was 90% or more; i.e., the yield was as high as that in, for example, Test Example 4.

<3-2> Examples 2 to 4 (RCP) and Comparative Example 2 (Unvulcanized) and Comparative Example 3 (Vulcanized with Peroxide)

TABLE 3
| | | Comparative Example 2 | Comparative Example 3 | Example 2 | Example 3 | Example 4 |
|---|---|---|---|---|---|---|
| Rubber | Rubber Type | EPDM | ↓ | ↓ | ↓ | ↓ |
| | Diene Type | VNB | ↓ | ↓ | ↓ | ↓ |
| | Diene Content [wt %] | 2.5 | ↓ | ↓ | ↓ | ↓ |
| Crosslinking Agent | | None | DCP | [2]Rot-(CNO)$_2$ | | |
| | | |  | 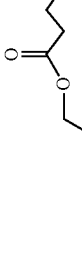 | | |
| Equivalent: CNO/Diene | | — | 0.1 | 1 | 2 | 4 |
| Solvent | | — | Toluene | ↓ | ↓ | ↓ |
| Reaction Temperature [° C.] | | — | 170 | 100 | ↓ | ↓ |
| Thickness [mm] | | 0.10 | 0.08 | 0.10 | 0.09 | 0.11 |
| Elongation at Break [%] | | >2400 | 460 | >2400 | 1700 | 1340 |
| Tensile Strength at Break [MPa] | | <0.19 | 3.20 | >1.76 | 3.22 | 5.69 |
| Young's Modulus [MPa] | | 0.28 | 0.28 | 0.3 | 0.38 | 0.52 |

The EPDM used was VNB-EPDM (diene content: 1.4% by mass) having a lower diene content than that used in Test Examples 4 to 8 of <1> described above.

In Examples 2 to 4, the aforementioned [2]Rot-(CNO)$_2$ was used as a crosslinking agent. In Comparative Example 2, a crosslinking agent was not used. In Comparative Example 3, dicumyl peroxide (DCP) of the following Formula 5 was used as a crosslinking agent.

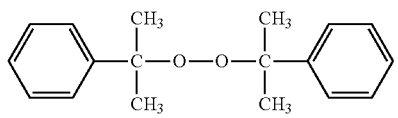

In Example 2, a film of RCP-EPDM rubber was formed in the same manner as in Example 1, except that the film was formed with an open coater, and the reaction time was changed to one hour.

In Example 3 or 4, a film of RCP-EPDM rubber was formed in the same manner as in Example 2, except that the amount of [2]Rot-(CNO)$_2$ was changed to 2 equivalents or 4 equivalents, respectively.

In Comparative Example 2, a film of unvulcanized VNB-EPDM was formed.

In Comparative Example 3, a film of peroxide-vulcanized EPDM rubber was formed in the same manner as in Example 2, except that the crosslinking agent was changed to DCP.

Figure 3:
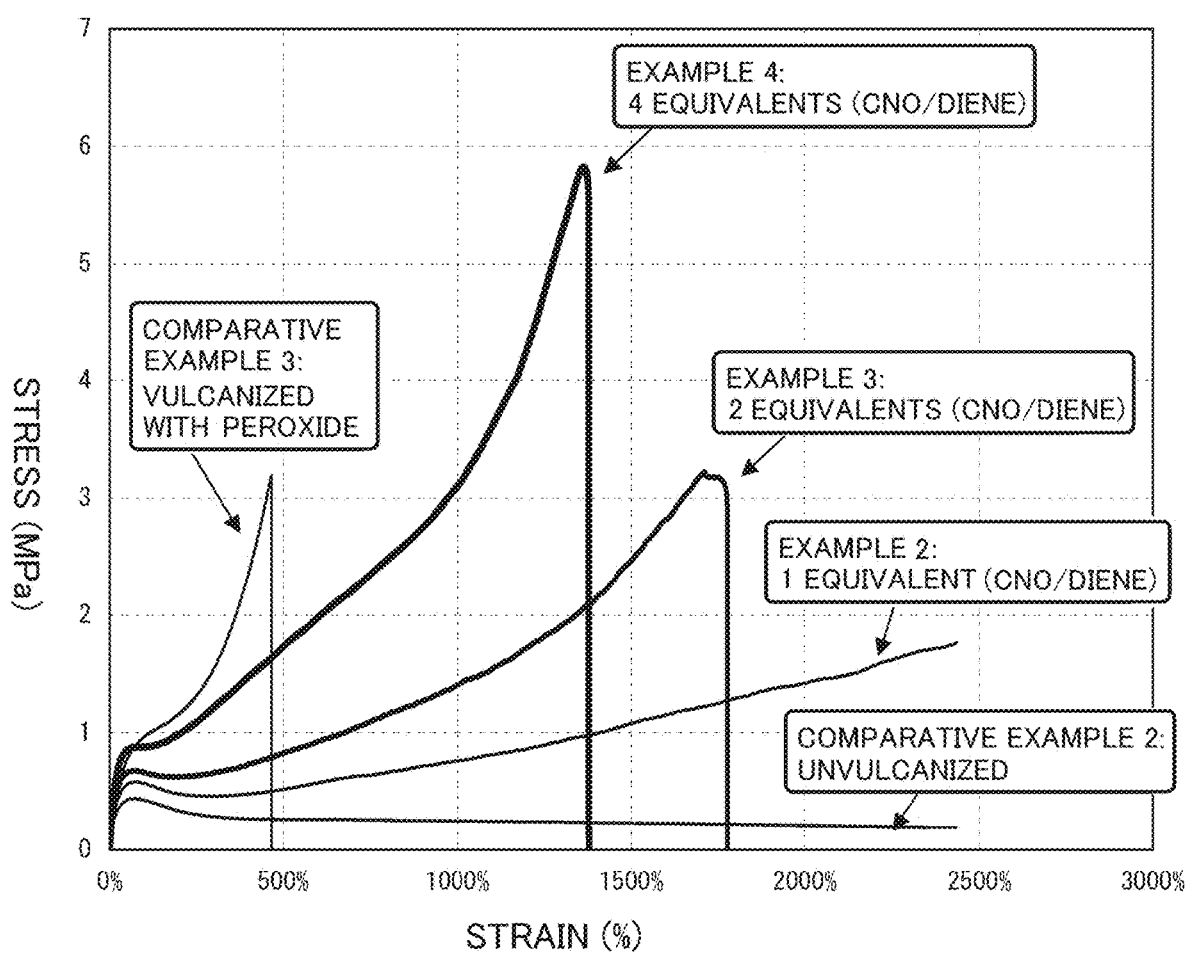
FIG. 3 is a graph showing stress-strain curves recorded in tensile tests in Examples 2 to 4 and Comparative Examples 2 and 3.

The thicknesses of the films formed in Examples 2 to 4 and Comparative Examples 2 and 3 were measured (Table 3). Each of these films was subjected to a tensile test in the same manner as in Example 1 described above, to thereby record a stress-strain curve (FIG. 3) and to measure elongation at break, tensile strength at break, and Young's modulus (calculated at 30% strain) (Table 3).

(Results of Measurements)

In Comparative Example 2, the measurement was stopped because of no breakage at 2,500% strain, and the stress was very low at the time of stopping the measurement.

In Comparative Example 3, the elongation at break was smaller than that in Comparative Example 1, and the tensile strength at break was higher than that in Comparative Example 1. These values correspond to those falling within a range commonly determined for EPDM.

In Example 2 (1 equivalent), the measurement was stopped because of no breakage at 2,500% strain, and the stress at the time of stopping the measurement was lower than the tensile strength at break in Example 1 (1 equivalent). This is probably attributed to that the thickness of the film differs from that in Example 1. The film of Example 2 satisfies the aforementioned tensile characteristic (B).

In Example 3 (2 equivalents), the elongation at break was smaller than that in Example 1 but was very large for EPDM, whereas the tensile strength at break was higher than that in Example 1 and also higher than that in Comparative Example 3 (vulcanized with peroxide). The film of Example 3 satisfies the aforementioned tensile characteristics (C) and (D).

In Example 4 (4 equivalents), the elongation at break was smaller than that in Example 2 but was well over 1,000%, whereas the tensile strength at break was higher than that in Example 2. The film of Example 4 satisfies the aforementioned tensile characteristics (E) and (F).

The present invention is not limited to the aforementioned examples. For example, as described below, the invention may be appropriately modified and embodied without departing from the spirit of the invention.

(1) Instead of VNB-EPDM used in the Examples, DCPD-EPDM or THI-EPDM, which was found to achieve a high yield in Test Examples 2 and 3 as compared with the case of Test Example 1 (DCPD-EPDM is more preferred from the viewpoint of higher yield), is used, and other conditions are set in the same manner as in the Examples. Even in such a case, the elongation and the tensile strength are increased, and the yield is considerably increased as compared with the case of ENB-EPDM (although the yield is lower than that in each of the Examples).

(2) The crosslinked rubber composition of the present invention is blended with another rubber polymer.

The invention claimed is:

1. A crosslinked rubber composition comprising ethylene-propylene-diene copolymer rubber crosslinked with a rotaxane compound having a cyclic molecule and an axial molecule penetrating through the cyclic molecule, wherein
    the ethylene-propylene-diene copolymer rubber contains vinylnorbornene, dicyclopentadiene, or tetrahydroindene as a diene component; and
    the rotaxane compound has a nitrile oxide group on the cyclic molecule and one end of the axial molecule, and the cyclic molecule is crown ether,
    wherein the rotaxane compound is incorporated in an amount of 0.1 to 5 equivalents, with the proviso that 0.5 mol of the rotaxane compound relative to 1 mol of the diene component is 1 equivalent of the rotaxane compound.

2. A crosslinked rubber composition comprising ethylene-propylene-diene copolymer rubber crosslinked with a rotaxane compound having a cyclic molecule and an axial molecule penetrating through the cyclic molecule, wherein
    the ethylene-propylene-diene copolymer rubber contains vinylnorbornene, dicyclopentadiene, or tetrahydroindene as a diene component; and
    the rotaxane compound has a nitrile oxide group on the cyclic molecule and one end of the axial molecule, and the cyclic molecule is crown ether,
    wherein the crosslinked rubber composition exhibits an elongation at break of at least 1,000%.

3. A crosslinked rubber composition comprising ethylene-propylene-diene copolymer rubber crosslinked with a rotaxane compound having a cyclic molecule and an axial molecule penetrating through the cyclic molecule, wherein
    the ethylene-propylene-diene copolymer rubber contains vinylnorbornene, dicyclopentadiene, or tetrahydroindene as a diene component; and
    the rotaxane compound has a nitrile oxide group on the cyclic molecule and one end of the axial molecule, and the cyclic molecule is crown ether,
    wherein the crosslinked rubber composition exhibits an elongation at break of at least 2,000% and a tensile strength at break of at least 1 MPa.

4. A crosslinked rubber composition comprising ethylene-propylene-diene copolymer rubber crosslinked with a rotaxane compound having a cyclic molecule and an axial molecule penetrating through the cyclic molecule, wherein
    the ethylene-propylene-diene copolymer rubber contains vinylnorbornene, dicyclopentadiene, or tetrahydroindene as a diene component; and
    the rotaxane compound has a nitrile oxide group on the cyclic molecule and one end of the axial molecule, and the cyclic molecule is crown ether, wherein the crosslinked rubber composition exhibits an elongation at break of at least 1,500% and a tensile strength at break of at least 2 MPa.

5. A crosslinked rubber composition comprising ethylene-propylene-diene copolymer rubber crosslinked with a rotaxane compound having a cyclic molecule and an axial molecule penetrating through the cyclic molecule, wherein
the ethylene-propylene-diene copolymer rubber contains vinylnorbornene, dicyclopentadiene, or tetrahydroindene as a diene component; and
the rotaxane compound has a nitrile oxide group on the cyclic molecule and one end of the axial molecule, and the cyclic molecule is crown ether,
wherein the crosslinked rubber composition exhibits a stress of at least 1 MPa at 1,000% elongation.

6. A crosslinked rubber composition comprising ethylene-propylene-diene copolymer rubber crosslinked with a rotaxane compound having a cyclic molecule and an axial molecule penetrating through the cyclic molecule, wherein
the ethylene-propylene-diene copolymer rubber contains vinylnorbornene, dicyclopentadiene, or tetrahydroindene as a diene component; and
the rotaxane compound has a nitrile oxide group on the cyclic molecule and one end of the axial molecule, and the cyclic molecule is crown ether,
wherein the crosslinked rubber composition exhibits an elongation at break of at least 1,000% and a tensile strength at break of at least 4 MPa.

7. A crosslinked rubber composition comprising ethylene-propylene-diene copolymer rubber crosslinked with a rotaxane compound having a cyclic molecule and an axial molecule penetrating through the cyclic molecule, wherein
the ethylene-propylene-diene copolymer rubber contains vinylnorbornene, dicyclopentadiene, or tetrahydroindene as a diene component; and
the rotaxane compound has a nitrile oxide group on the cyclic molecule and one end of the axial molecule, and the cyclic molecule is crown ether,
wherein the crosslinked rubber composition exhibits a stress of at least 1 MPa at 500% elongation.

* * * * *